US009726950B2

(12) United States Patent
Wen (10) Patent No.: US 9,726,950 B2
(45) Date of Patent: Aug. 8, 2017

(54) LIQUID CRYSTAL DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Liang Wen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 120 days.

(21) Appl. No.: 14/673,798

(22) Filed: Mar. 30, 2015

(65) Prior Publication Data

US 2016/0103375 A1     Apr. 14, 2016

(30) Foreign Application Priority Data

Oct. 8, 2014     (CN) .......................... 2014 1 0528071

(51) Int. Cl.
  *G02F 1/1362*     (2006.01)
  *G02F 1/1335*     (2006.01)
  *G02F 1/1339*     (2006.01)

(52) U.S. Cl.
  CPC .... *G02F 1/136209* (2013.01); *G02F 1/13394* (2013.01); *G02F 1/133514* (2013.01); *G02F 1/136286* (2013.01); *G02F 1/133512* (2013.01)

(58) Field of Classification Search
  CPC .. G02F 1/0107; G02F 1/1339; G02F 1/13392; G02F 1/13394; G02F 2001/13396; G02F 2001/13398; G02F 1/136209; G02F 1/133512

USPC .................. 349/155–157, 110, 111
See application file for complete search history.

(56) References Cited

U.S. PATENT DOCUMENTS

| 6,433,852 B1 * | 8/2002 | Sonoda ............. G02F 1/134363 349/141 |
| 6,690,441 B2 * | 2/2004 | Moriya ............... G02F 1/13394 349/106 |
| 7,751,020 B2 * | 7/2010 | Yanagawa ......... G02F 1/133707 349/129 |

(Continued)

FOREIGN PATENT DOCUMENTS

| CN | 201812117 U | 4/2011 |
| CN | 102650770 A | 8/2012 |

(Continued)

*Primary Examiner* — Angela Davison
(74) *Attorney, Agent, or Firm* — Anova Law Group, PLLC (57) ABSTRACT

A liquid crystal panel is disclosed. The panel includes a first substrate, having a plurality of color filter units. The panel also includes a second substrate disposed opposed to the first substrate, where the second substrate includes a plurality of gate lines, a plurality of data lines intersecting and insulated from the gate lines, and a plurality of pixel units connected to the gate and data lines. The panel also includes a liquid crystal layer disposed between the first substrate and the second substrate, and a shielding pillar disposed between two adjacent color filter units, where the shielding pillar includes a plurality of discontinuous auxiliary shielding pillars, and where each auxiliary shielding pillar intersects a data line at an included angle.

17 Claims, 11 Drawing Sheets

(56) References Cited

U.S. PATENT DOCUMENTS

| | | | |
|---|---|---|---|
| 8,179,514 B2* | 5/2012 | Kurozumi | G02F 1/13394 349/155 |
| 8,514,359 B2* | 8/2013 | Takeda | G02F 1/133377 349/123 |
| 2011/0187631 A1 | 8/2011 | Lee et al. | |
| 2013/0033654 A1* | 2/2013 | Kim | G02F 1/133509 349/38 |

FOREIGN PATENT DOCUMENTS

| | | |
|---|---|---|
| CN | 102799017 A | 11/2012 |
| CN | 203054412 U | 7/2013 |
| JP | 2001201750 A | 7/2001 |

* cited by examiner

FIG. 15

LIQUID CRYSTAL DISPLAY PANEL AND DISPLAY DEVICE

CROSS-REFERENCES TO RELATED APPLICATIONS

This application claims the benefit of priority to Chinese Patent Application No. 201410528071.9, filed with the Chinese Patent Office on Oct. 8, 2014 and entitled "LIQUID CRYSTAL DISPLAY PANEL AND DISPLAY DEVICE", the content of which is incorporated herein by reference in its entirety.

TECHNICAL FIELD

The present invention relates to the field of display, and particularly relates to a liquid crystal display panel and a liquid crystal display device including the panel.

BACKGROUND OF THE INVENTION

A liquid crystal display panel and a liquid crystal display device are one of the current mainstream display technologies. In general, the display panel includes an upper substrate and a lower substrate, the upper substrate is called a color filter substrate (CF substrate) and is provided with a plurality of color filter units with different colors (e.g., red, green, blue). When light enters the color filter units, different colors will be shown, and in each pixel, different colors are shown by adjusting the proportions of the red light, the green light and the blue light. The lower substrate is called a thin film transistor substrate (TFT substrate) and is provided with a plurality of thin film transistors.

In a traditional liquid crystal display, the CF substrate and the TFT substrate are adhered by adhesive to form a display panel, a black matrix (BM) is disposed on the CF substrate, data lines are disposed on the TFT substrate, and the CF substrate and the TFT substrate can shield the light of adjacent pixels to prevent the light from interfering with the adjacent pixels, in order to avoid the color mixing phenomenon of the display. With higher and higher resolution of the liquid crystal display, the widths of the black matrix and the data lines are smaller and smaller, and the color mixing phenomenon becomes increasingly serious.

BRIEF SUMMARY OF THE INVENTION

One inventive aspect is a liquid crystal panel. The panel includes a first substrate, having a plurality of color filter units. The panel also includes a second substrate disposed opposed to the first substrate, where the second substrate includes a plurality of gate lines, a plurality of data lines intersecting and insulated from the gate lines, and a plurality of pixel units connected to the gate and data lines. The panel also includes a liquid crystal layer disposed between the first substrate and the second substrate, and a shielding pillar disposed between two adjacent color filter units, where the shielding pillar includes a plurality of discontinuous sub shielding pillars, and where each sub shielding pillar intersects a data line at an included angle.

DETAILED DESCRIPTION OF THE PREFERRED EMBODIMENTS

A further detailed illustration of the present invention will be given below in combination with drawings and embodiments. It shall be understood that, the specific embodiments described herein are merely used for explaining the present invention rather than limiting the present invention. In addition, it should be noted that, for convenience of description, only the parts related to the present invention, rather than all structures, are shown in the drawings.

Figure 1:
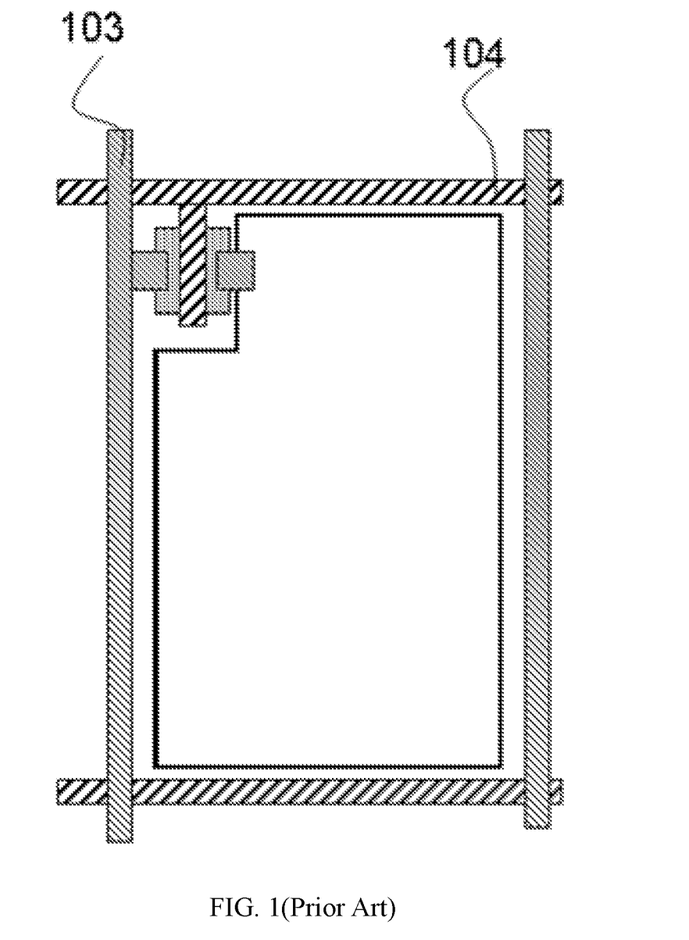
FIG. 1 is a schematic diagram of a top view of a liquid crystal panel in the prior art.
Figure 2:
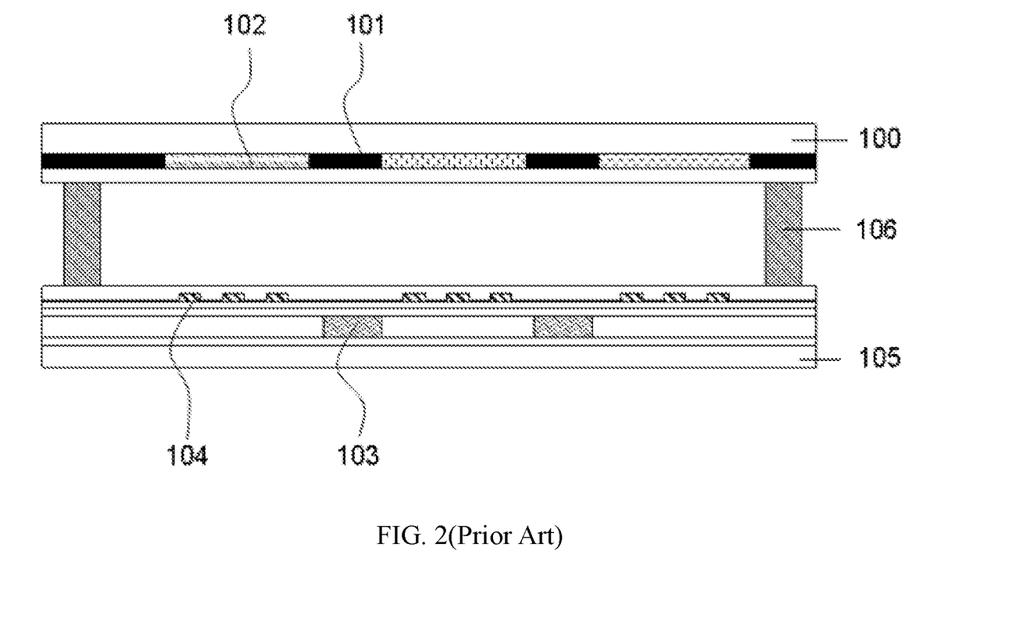
FIG. 2 is a schematic diagram of a sectional view of a liquid crystal panel in the prior art.

FIG. 1 is a top view of pixel units of a liquid crystal panel in the prior art, each pixel unit is provided with data lines 103 and gate lines 104 which are intersected and insulated with the data lines, and one pixel unit is defined by its the data lines 103 and the gate lines 104. FIG. 2 is a sectional view of a structure of a liquid crystal panel in the prior art, 100 represents a CF substrate, 105 represents a TFT substrate, a liquid crystal is disposed between the CF substrate 100 and the TFT substrate 105, and adhesive 106 is used for connecting the upper and the lower substrates. The CF substrate 100 includes a black matrix 101 and color filter units 102. The TFT substrate 105 includes the data lines 103, a pixel electrode 104 and the like. The data lines 103 divide the liquid crystal panel into a plurality of pixel units, each pixel unit corresponds to one color filter unit 102, the pixel units corresponding to three color filter units with different colors form a total pixel unit, and the three pixel units respectively display different brightnesses to synthesize different colors. In this panel structure, when viewing a displayed image from different angles, due to the existence of incident light of the adjacent pixel units, a color mixing phenomenon will occur.

Figure 3:
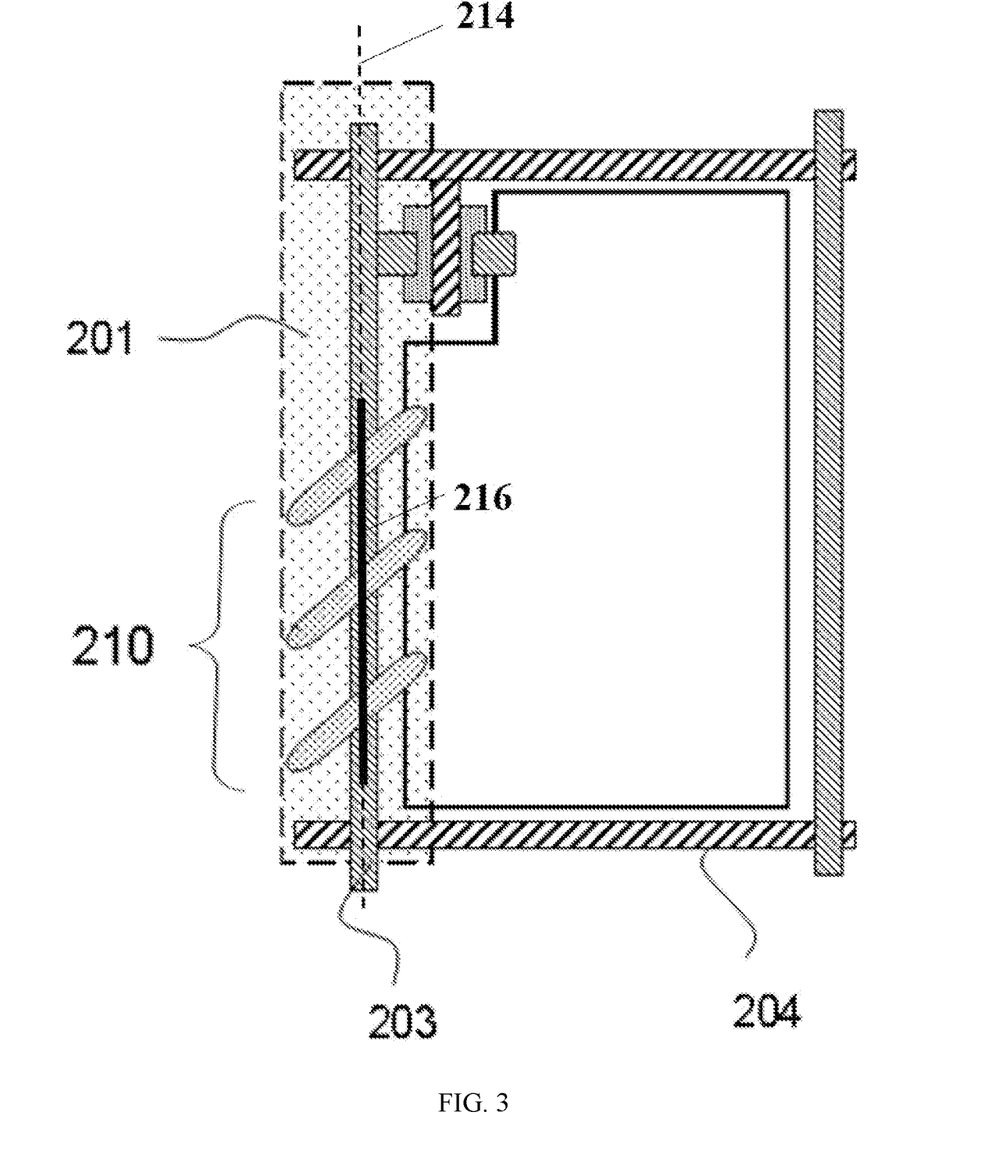
FIG. 3 is a schematic diagram of a top view of a liquid crystal panel provided by an embodiment of the present invention.
Figure 4:
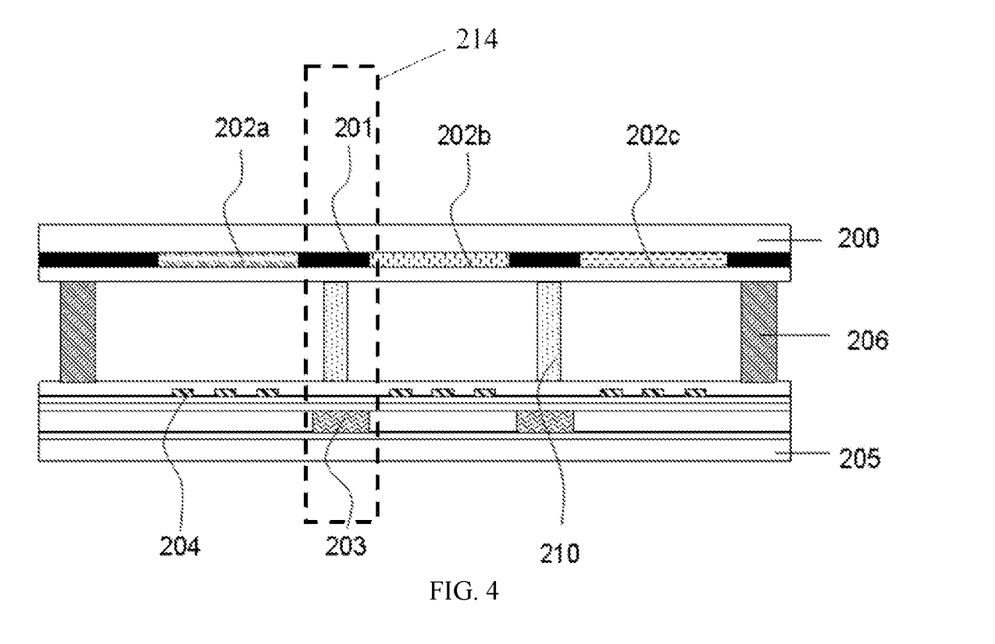
FIG. 4 is a schematic diagram of a sectional view of a liquid crystal panel provided by an embodiment of the present invention.
Figure 5:
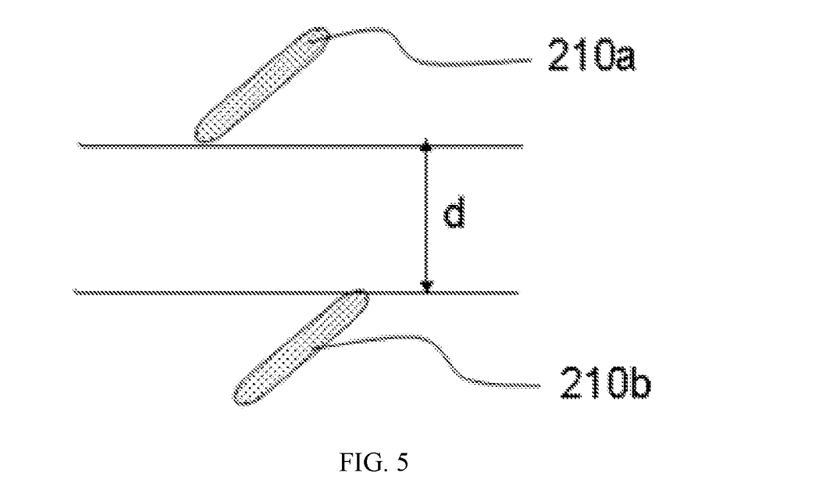
FIG. 5 is a schematic diagram of a vertical distance of a sub shielding pillar provided by an embodiment of the present invention.
Figure 6:
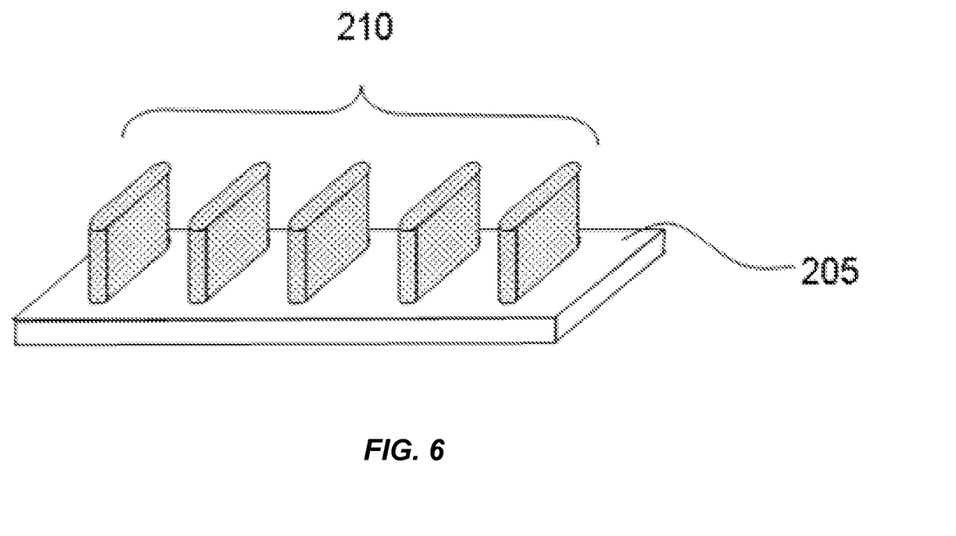
FIG. 6 is a schematic diagram of a stereogram of a shielding pillar in an embodiment of the present invention.

FIG. 3 is a top view of a pixel structure in an embodiment of the present invention. In FIG. 3, data lines 203 are intersected and insulated with gate lines 204 to define one pixel unit. FIG. 4 is a structural schematic diagram of a panel in an embodiment of the present invention. It can be seen from FIG. 4 that, the data lines 203 and a pixel electrode 204 are disposed on a TFT substrate 205, color filter units 202a, 202b, 202c are disposed on a CF substrate 200, and optionally, the above-mentioned three color filter units are respectively red (R), green (G) and blue (B). A black matrix (BM) is disposed between two adjacent color filter units, and optionally, the black matrix is made of a black resin material to prevent the light from penetrating. The CF substrate 200 and the TFT substrate 205 are adhered together by adhesive 206. A shielding pillar 210 is disposed between the CF substrate 200 and the TFT substrate 205. Optionally, the shielding pillar is located between adjacent color filter units, that is, corresponding to a black matrix 201 on the CF substrate 200. The shielding pillar 210 includes a plurality of discontinuous sub shielding pillars, and there is an included angle between each sub shielding pillar and the data line direction. Since there is an included angle between each sub shielding pillar and the data line 203 direction, compared with the method without included angle in the traditional process technology, the liquid crystal molecules are easier to diffuse along the direction of the sub shielding pillar. Referring to FIG. 3 and FIG. 4 due to the included angle, although the sub shielding pillars are discontinuous, the light can be completely shielded in the direction of a first plane 214 to prevent the incidence of light in adjacent pixels. Optionally, the projections 216 of the sub shielding pillars on the first plane 214 are continuous in at least one pixel unit along the data line 203 direction. The first plane 214 refers to a plane including the data lines 203 and vertical to the first substrate 200, or the first plane 214 refers to a plane parallel to the plane which is including the data lines 203 and is vertical to the first substrate. Since the liquid crystal exists between the TFT substrate and the CF substrate, continuous shielding pillars will block the diffusion of the liquid crystal to result in poor display, however, the sub shielding pillars in the present invention are discontinuous, thereby providing diffusion space for the diffusion of the liquid crystal, and meanwhile effectively shielding the light to prevent the light of the pixel unit from entering the adjacent pixel units, so that color cast is avoided. The projections 216 of the sub shielding pillars are continuously disposed in at least one pixel unit along the data line direction, thereby ensuring that the light from the adjacent pixel units is completely shielded to prevent mutual interference. In combination with FIG. 3, optionally, the shielding pillar 210 is provided with a plurality of discontinuous sub shielding pillars, the sub shielding pillars are sheet-like and are mutually parallel, namely, in the shape of a shutter. As shown in FIG. 5, the vertical distance d between the tail of the first sub shielding pillar 210a and the head of the second auxiliary shielding pillar 210b is smaller than 10 microns. Optionally, the vertical distance d between the tail of the first sub shielding pillar 210a and the head of the second sub shielding pillar 210b is equal to 0, namely, the sub shielding pillars of the shielding pillar 210 are interconnected end-to-end to prevent the light from entering the adjacent pixel units, so as to reduce the color cast. Compared with the continuous shielding pillars, the advantages of this structure lie in that, since the liquid crystal exists between the TFT substrate and the CF substrate, the continuous shielding pillars will block the diffusion of the liquid crystal to result in poor display, however, the shielding pillars in the present invention are discontinuous, thereby providing diffusion space for the diffusion of the liquid crystal, moreover, the structure similar to the shutter is adopted, although the shielding pillars are discontinuous, due to the included angle between them and the gate line direction, the light of the adjacent sub-pixels can be effectively blocked, and when the distance d is equal to 0, the color cast problem caused by crosstalk of the light of the adjacent sub-pixels can be completely prevented. The sheet-like structure is convenient to process, and the surface thereof is smooth to facilitate the flow and diffusion of the liquid crystal molecules. To describe the shielding pillar in the present invention more clearly, FIG. 6 shows a schematic diagram of a stereogram of a shielding pillar in an embodiment of the present invention, in FIG. 6, 205 represents the TFT substrate, to make the figure be clearer, such structures as the data lines above the TFT substrate and the like are not shown herein. The shielding pillar 210 is disposed above the TFT substrate 205, it can be seen from the space diagram that, in this embodiment, the shielding pillar 210 is of a discontinuous structure and includes a plurality of sub shielding pillars, and the sub shielding pillars are mutually parallel to form a shutter structure.

Figure 7:
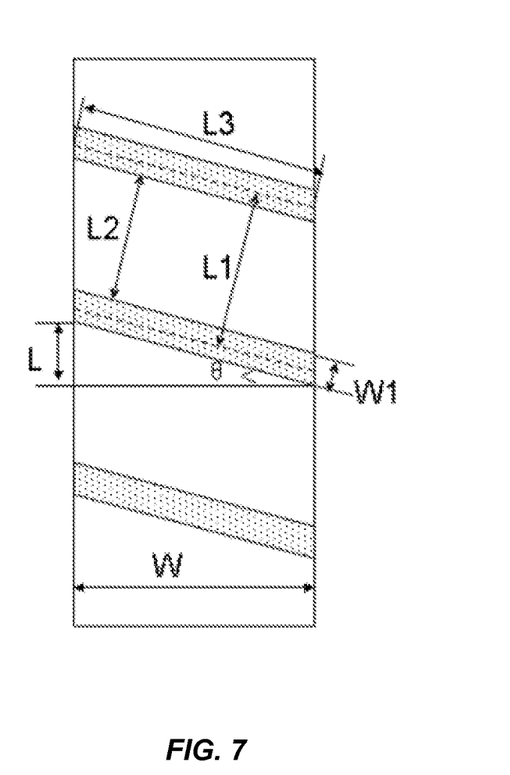
FIG. 7 is a schematic diagram of a top view of a shielding pillar in an embodiment of the present invention.

FIG. 7 shows a schematic diagram of a shielding pillar in an embodiment of the present invention, in the figure, the width of the shielding pillar is W, the width of each sub shielding pillar is W1, the central distance between the adjacent sub shielding pillars is L1, the edge distance between the adjacent sub shielding pillars is L2, the central length of each sub shielding pillar is L3, and the included angle between each auxiliary shielding pillar and the horizontal direction is θ. In addition, ΔL refers to the additional route needing to be travelled by the liquid crystal, compared with transverse diffusion, after the shielding pillar shown in this embodiment is disposed, and N represents the number of the sub shielding pillars in each pixel unit. Herein, L2 represents space where the liquid crystal can flow. According to FIG. 7, the following relational expression is obtained:

$$L1=L2+W1; L3=W/\cos\theta; \Delta L=L3-W=W/\cos\theta-W;$$
$$L=W*\tan\theta; N=\text{length of the sub-pixel}/L.$$

Herein, the smaller the width W1 of each sub shielding pillar is, the higher the aperture ratio of the panel is, thus under the allowance of the existing process, the width W1 of each sub shielding pillar is processed as small as possible, and optionally, the width W1 of each sub shielding pillar is larger than or equal to 1 μm. Moreover, for example, W1 is equal to 1 μm. In case of the opening area of one pixel unit being 16*44.5 μm (width multiply length), the following data are obtained:

TABLE 1

| θ | L2/μm | L3/μm | ΔL/μm | N/μm | L2* (N − 1) |
|---|---|---|---|---|---|
| 0 |  | 5 | 0 |  |  |
| 5 |  | 5.02 | 0.02 | 101.73 | 0.00 |
| 10 |  | 5.08 | 0.08 | 50.47 | 0.00 |
| 15 |  | 5.18 | 0.18 | 33.22 | 0.00 |
| 20 | 0.71 | 5.32 | 0.32 | 24.45 | 16.65 |
| 25 | 1.11 | 5.52 | 0.52 | 19.09 | 20.13 |
| 30 | 1.50 | 5.77 | 0.77 | 15.42 | 21.62 |
| 35 | 1.87 | 6.10 | 1.10 | 12.71 | 21.87 |
| 40 | 2.21 | 6.53 | 1.53 | 10.61 | 21.27 |
| 45 | 2.54 | 7.07 | 2.07 | 8.90 | 20.03 |
| 50 | 2.83 | 7.78 | 2.78 | 7.47 | 18.31 |
| 55 | 3.10 | 8.72 | 3.72 | 6.23 | 16.20 |
| 60 | 3.33 | 10.00 | 5.00 | 5.14 | 13.78 |
| 65 | 3.53 | 11.83 | 6.83 | 4.15 | 11.12 |
| 70 | 3.70 | 14.62 | 9.62 | 3.24 | 8.28 |
| 75 | 3.83 | 19.32 | 14.32 | 2.38 | 5.30 |
| 80 | 3.92 | 28.79 | 23.79 | 1.57 | 2.23 |

TABLE 1-continued

| θ | L2/μm | L3/μm | ΔL/μm | N/μm | L2* (N − 1) |
|---|---|---|---|---|---|
| 85 | 3.98 | 57.37 | 52.37 | 0.78 | −0.88 |
| 90 |  | 5.00 | 0.00 |  | 0.00 |
| 95 | 3.98 | 57.37 | 52.37 | 0.78 | −0.88 |
| 100 | 3.92 | 28.79 | 23.79 | 1.57 | 2.23 |
| 105 | 3.83 | 19.32 | 14.32 | 2.38 | 5.30 |
| 110 | 3.70 | 14.62 | 9.62 | 3.24 | 8.28 |
| 115 | 3.53 | 11.83 | 6.83 | 4.15 | 11.12 |
| 120 | 3.33 | 10.00 | 5.00 | 5.14 | 13.78 |
| 125 | 3.10 | 8.72 | 3.72 | 6.23 | 16.20 |
| 130 | 2.83 | 7.78 | 2.78 | 7.47 | 18.31 |
| 135 | 2.54 | 7.07 | 2.07 | 8.90 | 20.03 |
| 140 | 2.21 | 6.53 | 1.53 | 10.61 | 21.27 |
| 145 | 1.87 | 6.10 | 1.10 | 12.71 | 21.87 |
| 150 | 1.50 | 5.77 | 0.77 | 15.42 | 21.62 |
| 155 | 1.11 | 5.52 | 0.52 | 19.09 | 20.13 |
| 160 | 0.71 | 5.32 | 0.32 | 24.45 | 16.65 |
| 165 |  | 5.18 | 0.18 | 33.22 | 0.00 |
| 170 |  | 5.08 | 0.08 | 50.47 | 0.00 |
| 175 |  | 5.02 | 0.02 | 101.73 | 0.00 |
| 180 |  | 5.00 | 0.00 |  |  |

Since the length of the opening area of the pixel unit is selected to be 44.5 μm, each pixel unit can hold at most 44.5/1=44.5 sub shielding pillars, taking the widths and the process errors of the sub shielding pillars into consideration, at most 44 sub shielding pillars are disposed in one pixel unit, namely, N is not larger than 44, the angle θ is screened according to this condition to obtain that θ ranges from 25 degrees to 165 degrees. ΔL refers to the additional route needing to be travelled by the liquid crystal, compared with transverse diffusion, after the shielding pillar shown in this embodiment is disposed, if the route difference is too large, it indicates that the diffusion of the liquid crystal is influenced by the dispose of the shielding pillar. According to the ΔL value, the angle θ ranges from 5 degrees to 75 degrees and ranges from 105 degrees to 175 degrees. L2 represents the edge distance between adjacent sub shielding pillars, namely, the diffusion space of the liquid crystal. The larger the L2 is, the easier the liquid crystal is to diffuse, thus according to L2, the selected angle θ ranges from 25 degrees to 155 degrees. L2*(N−1) represents the diffusion space of the liquid crystal in the entire pixel unit, accordingly, the selected angle ranges from 20 degrees to 60 degrees and ranges from 120 degrees to 160 degrees, an intersection set is extracted from the above-mentioned ranges of the angle θ to obtain that the angle θ ranges from 25 degrees to 60 degrees and ranges from 120 degrees to 155 degrees. In addition, other parameters can be selected by referring to the corresponding values corresponding to the angle range. By selecting the numerical value range in the present application, the shielding pillar can play a shielding role to prevent the color cast, ensure sufficient diffusion space for the liquid crystal molecules, ensure the diffusion uniformity of the liquid crystal molecules in the transverse and longitudinal directions and solve the problems of shielding and liquid crystal diffusion. Optionally, the range of the width of each sub shielding pillar is 0.1-100 μm. Optionally, the range of the distance between the sub shielding pillars is 0.1-40 μm.

Figure 8:
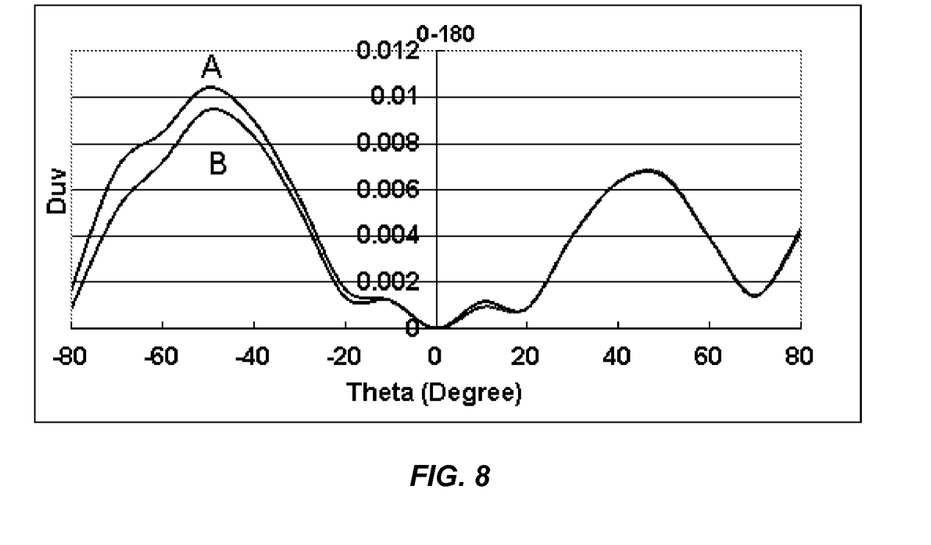
FIG. 8 is a data simulation diagram in an embodiment of the present invention.

FIG. 8 is a schematic diagram of data simulation in an embodiment of the present invention when θ is equal to 45 degrees. In FIG. 8, the horizontal ordinate represents the included angle between a human eye and the display panel, the vertical coordinate represents the color cast degree, A represents the color cast curve of the panel provided with no shielding pillar, and B represents the color cast curve of the panel provided with the shielding pillar. It can be seen from the figure that, the color cast degree of the panel provided with the shielding pillar can be obviously reduced.

Figure 9:
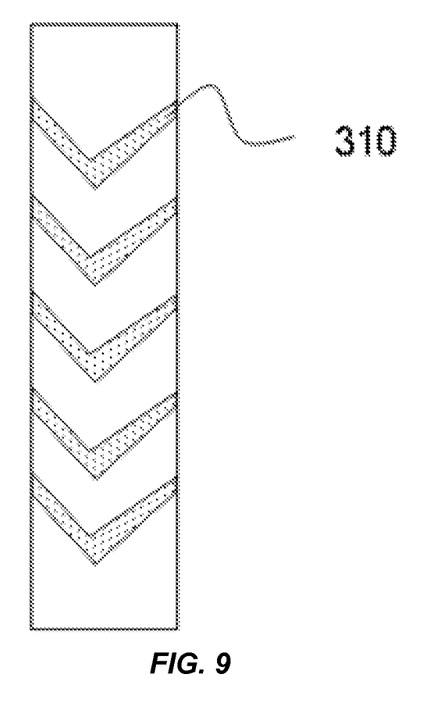
FIG. 9 is a schematic diagram of a top view of a shielding pillar in an embodiment of the present invention.

FIG. 9 is a top view of an embodiment in the present invention. In this embodiment, the sub shielding pillar is disposed to be polyline-shaped. Optionally, the sub shielding pillar 310 is disposed to be V-shaped. The advantages of this embodiment lie in that no color mixing phenomenon will be generated when viewing the image on the panel from any angle. This is because when the sub shielding pillar is not broken line-shaped, for example, when the angle θ is 45 degrees, the light will still leak between the two adjacent sub shielding pillars to generate color mixing when viewing the image on the panel at an angle of 45 degrees. In this embodiment, a V-shaped design is adopted, optionally, the included angle θ between one side edge of the V shape and the horizontal direction ranges from 25 degrees to 60 degrees, the included angle θ between the other side edge and the horizontal direction ranges from 120 degrees to 155 degrees, for example, the included angle between one side edge and the horizontal direction is 45 degrees, the included angle between the other side edge and the horizontal direction is 135 degrees, when the included angle between the human eye and the panel is 45 degrees, the light will be shielded by the side edge of 135 degrees, and when the included angle between the human eye and the panel is 134 degrees, the light will be shielded by the side edge of 45 degrees, so that no color mixing will be generated no matter viewing the image from any angle.

The larger the central distance L1 between the sub shielding pillars is, the larger the flow space of the liquid crystal molecules is, which is beneficial to the uniform diffusion of the liquid crystal molecules. Meanwhile, the larger the distance L1 is, the larger the needed width W is, the overlarge width will influence the aperture ratio of the panel, and optionally, the range of the central distance L1 between the sub shielding pillars is 1-5 μm.

Optionally, the shielding pillar is located above the data lines to cover at least a part of the data lines. Optionally, the shielding pillar covers all the data lines along the width, namely, the width W of the shielding pillar is larger than or equal to the width of each data line. Since the rotation of the liquid crystal above the data lines is difficult to control, the liquid crystal is shielded by the shielding pillar, to improve the aperture ratio of the panel, and the larger the width of the shielding pillar is, the better the shielding effect is.

Figure 10:
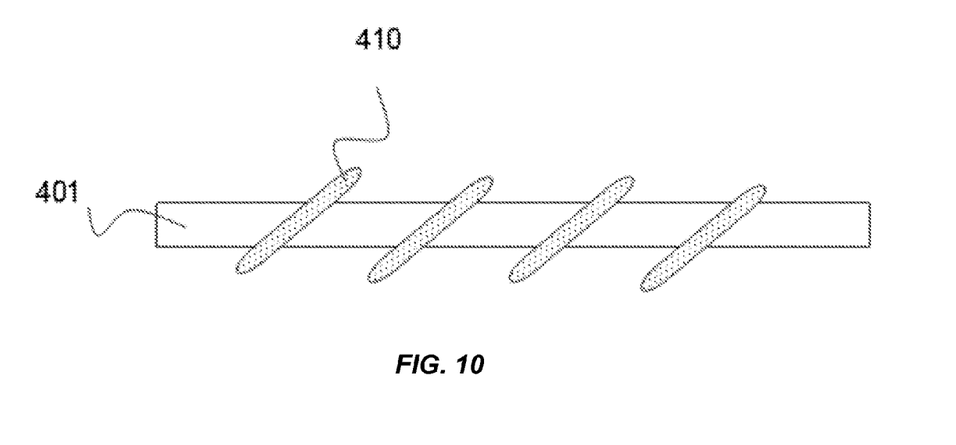
FIG. 10 is a schematic diagram of a top view of a shielding pillar in an embodiment of the present invention.

FIG. 10 is a schematic diagram of a shielding pillar in an embodiment of the present invention, in FIG. 10, the width W of the shielding pillar 410 is smaller than or equal to the width of a black matrix 401 (BM) on the CF substrate, and the beneficial effects of this design lie in that the BM is required to be narrower in a higher PPI product. It is assumed that, BM is designed to 6 microns, then the BM between the shielding structures is reduced to 5 μm, and the BM still plays a good shielding role when viewing from the front face. When viewing from the side face, the shielding structure plays the shielding role, and the width of the BM can be correspondingly decreased. At this time, the aperture ratio of the panel will be increased, while the display effect is unchanged.

The shielding pillar is located between the upper and lower substrates, in order to shield the light between the adjacent pixels, and for different visual angles, a certain corresponding height of the shielding pillar is necessary. The higher the shielding pillar is, the stronger the light shielding capacity is, and the light in a larger visual angel can be shielded. Optionally, the height range of the shielding pillar is 0.1-100 μm. Optionally, the height of the shielding pillar is larger than or equal to ¼ of the distance between the first substrate and the second substrate. Optionally, the height of the shielding pillar is larger than or equal to ½ of the distance between the first substrate and the second substrate.

Figure 11:
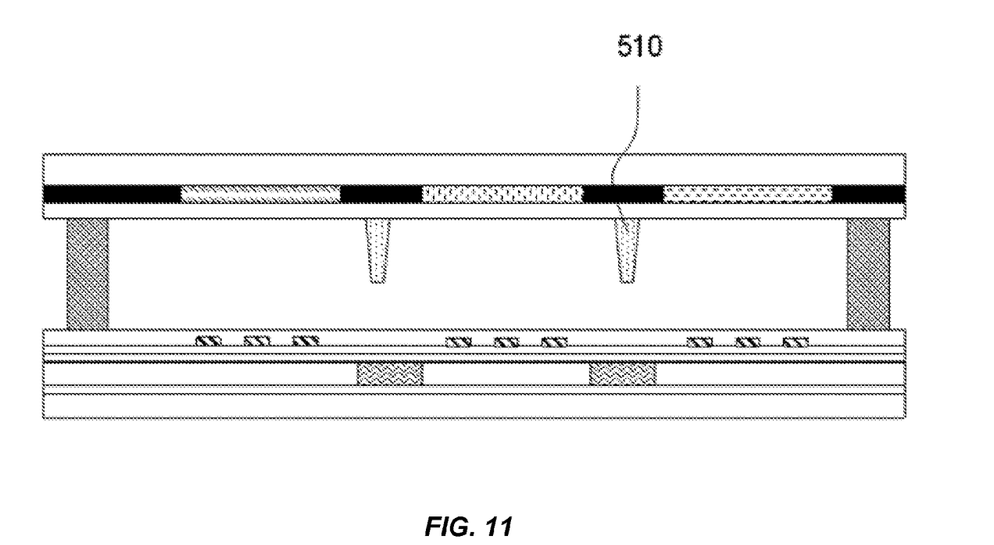
FIG. 11 is a schematic diagram of a sectional view of a liquid crystal panel provided by an embodiment.

See FIG. 4 again, in an embodiment of the present invention, one or more shielding pillars are respectively in contact with the first substrate and the second substrate. In this embodiment, besides playing the shielding role, the shielding pillar can also serve as a spacer between the upper and lower substrates. This design is simple in process, and the shielding pillar and the spacer are manufactured at the same time. Please see FIG. 11, which is an embodiment of the present invention, in this embodiment, the height of at least one shielding pillar is smaller than the distance between the first substrate and the second substrate. When the height of the shielding pillar 510 is smaller than the distance between the first substrate and the second substrate, the shielding pillar can play the role of a sub-spacer, and when the panel is pressed, the sub-spacer supports the substrates. Optionally, the panel simultaneously includes a shielding pillar contacting both of the upper and lower substrates and a shielding pillar with the height smaller than the distance between the upper and lower substrates. Optionally, the material of the shielding pillar is the same as the material of the spacer, so that the shielding pillar and the spacer can be made in the same process by using a halftone mask.

Figure 12:
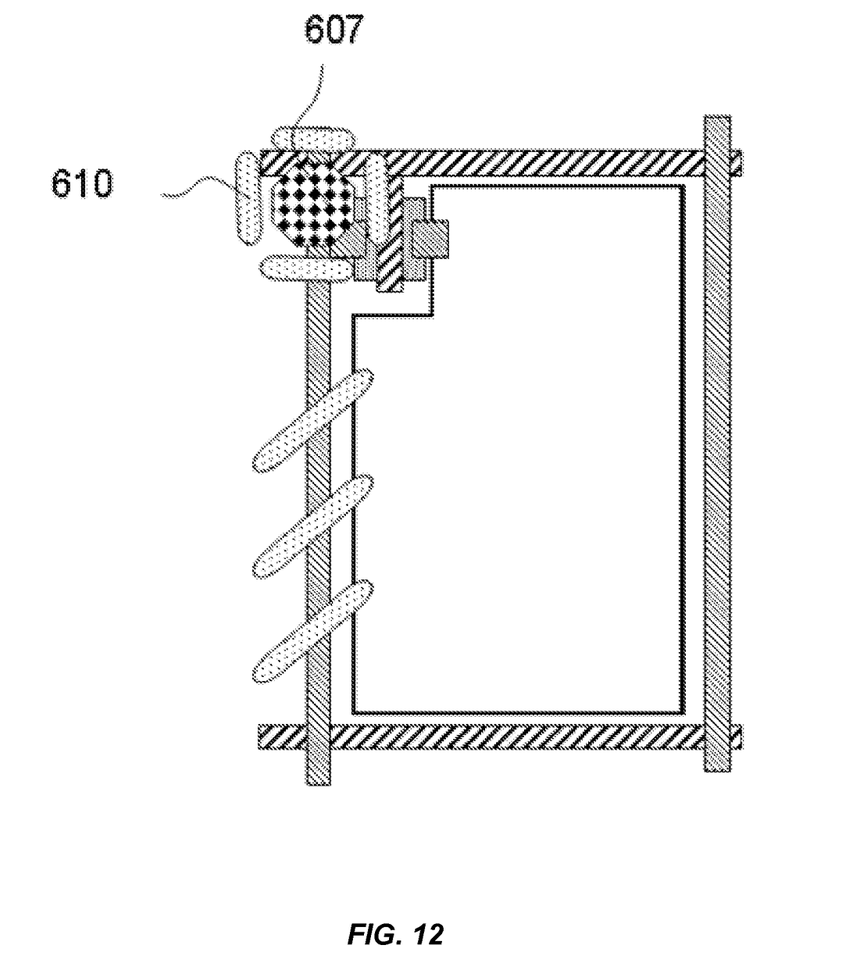
FIG. 12 is a schematic diagram of a top view of a liquid crystal panel provided by an embodiment of the present invention.

FIG. 12 is a top view of a pixel structure in an embodiment of the present invention. In this embodiment, the liquid crystal panel further includes a spacer 607, shielding pillars 610 are disposed on at least two sides of the spacer 607, optionally, the shielding pillars 610 are disposed on four sides of the spacer 607, and this design can be used for avoiding the problem that an alignment film is scratched by the movement of the spacer to generate a bright spot. Meanwhile, after the shielding pillars are manufactured in the horizontal direction, the shielding pillars can fill depressions of holes of a planarizing layer, thus the smoothness of the planarizing layer may not be considered any more, and the pixels of the display may be manufactured to be smaller, accordingly, the resolution can be greatly improved. It should be noted that, the drawings in the present application do not represent the real size or proportion, and in order to highlight the key point of the present invention, the proportion of a local component will be increased or decreased.

Figure 13:
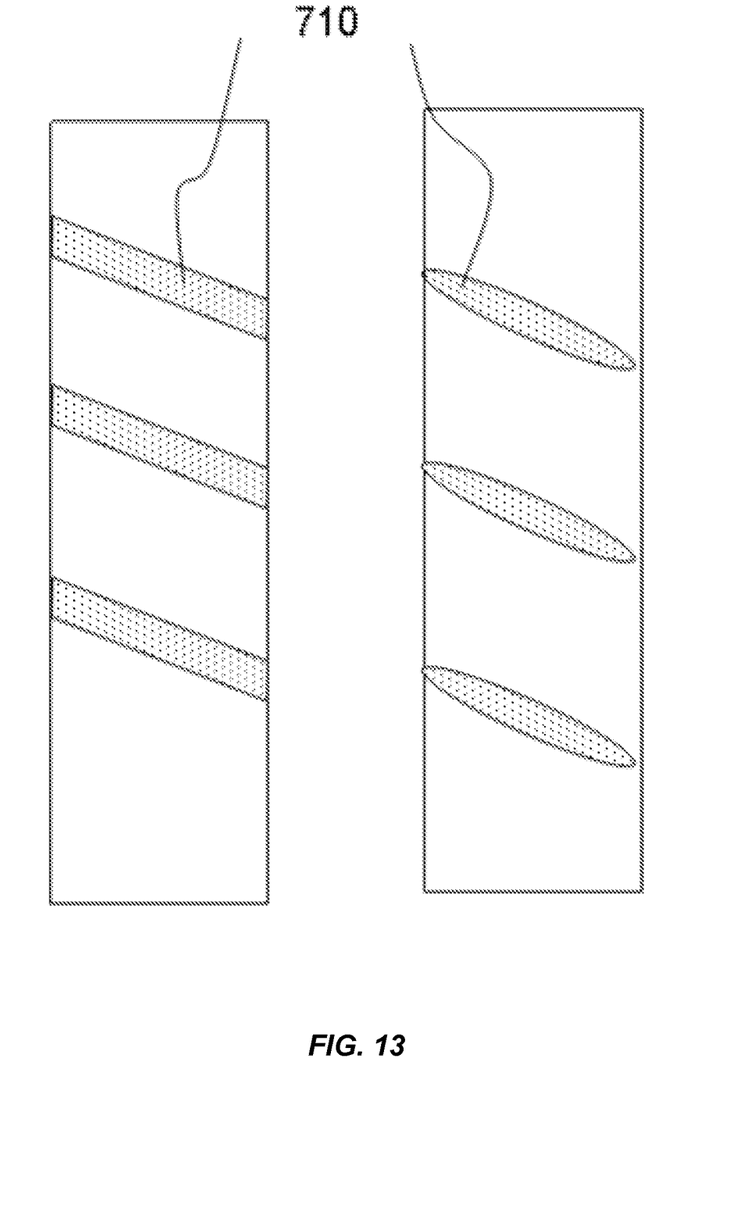
FIG. 13 is a schematic diagram of a top view of a shielding pillar in an embodiment of the present invention.

Please see FIG. 13, for the shape of the sub shielding pillar 710, the section of the top view thereof can be such shapes as a rectangle, an oval, a rounded rectangle, a quadrangle, a rhombus, a circle and the like. Such figures with large central widths as the oval, the rhombus and the like have a flow guide effect. Since the external space thereof is larger than the central space, the liquid crystal molecules are liable to flow in, thereby having better diffusion capacity. For such shapes as the rectangle, the quadrangle and the like, due to the uniform structures thereof, larger diffusion space can be reserved for the liquid crystal molecules.

Figure 14:
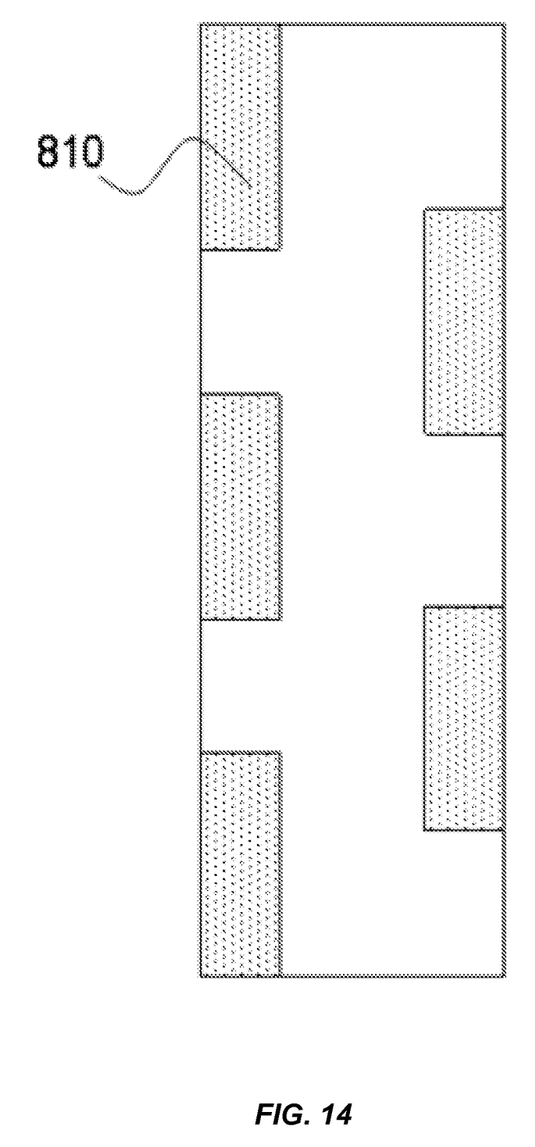
FIG. 14 is a schematic diagram of a top view of a shielding pillar in a contrast example of the present invention.

Please see FIG. 14, it is a contrast example of the present invention. In this embodiment, the discontinuous structures of a shielding pillar 810 are divided into two or multiple rows, each row has a discontinuous structure, the part corresponding to the shielding pillar is a shielding part, the part provided with no shielding pillar is a light transmitting part, and light transmitting parts of one row corresponds to the shielding parts of the other rows, to achieve a lightproof effect of the entirety along the data line direction. In this contrast example, the liquid crystal molecules are diffused from the area between two rows, compared with the foregoing embodiments, since there is no angle, the flow of the liquid crystal molecules is influenced to a larger extent, so that the diffusion capacity is relatively poor.

Since the shielding pillar is disposed in the present invention, during alignment, when rubbing alignment is performed by adopting traditional rubbing cloth, a part of areas are difficult to align, thus, optionally, the liquid crystal panel in the present invention is aligned by adopting an optical alignment method, to solve the problem that the concave-convex surface caused by the shielding pillar is difficult to be subjected to friction alignment.

Optionally, the shielding pillar is made of a material with low light transmittance, for example, a black resin material, a metal and the like.

Figure 15:
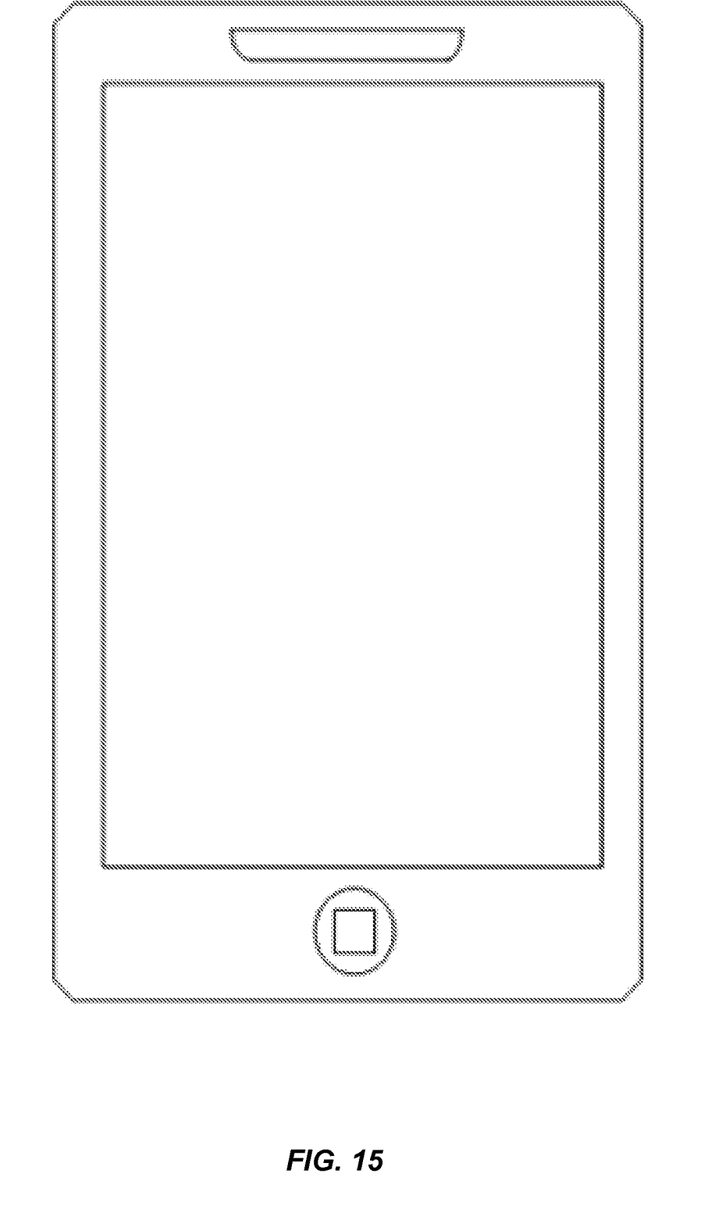
FIG. 15 is a schematic diagram of a display device provided by the present invention.

Please see FIG. 15, the present invention further includes a display device, including the above-mentioned display panel.

It should be noted that, the foregoing descriptions are merely preferred embodiments and adopted technical principles of the present invention. Those skilled in the art will appreciate that the present invention is not limited to the specific embodiments described herein, and those skilled in the art can make various obvious variations, readjustments and substitutions without departing from the protection scope of the present invention. Thus, although the present invention has been described in detail through the foregoing embodiments, the present invention is not limited to the above-mentioned embodiments and can further include more other equivalent embodiments without departing from the concept of the present invention, and the scope of the present invention is determined by the scope of the appended claims.

What is claimed is:

1. A liquid crystal panel comprising: a first substrate, comprising a plurality of color filter units; a second substrate disposed opposed to the first substrate, wherein the second substrate comprises: a plurality of gate lines, a plurality of data lines intersecting and insulated from the gate lines, and a plurality of pixel units connected to the gate and data lines; a liquid crystal layer disposed between the first substrate and the second substrate; and a shielding pillar disposed between two adjacent color filter units, wherein the shielding pillar comprises a plurality of discontinuous sub shielding pillars, each sub shielding pillar intersects a data line at an included angle between 0 degrees and 90 degrees, and projections of the sub shielding pillars on a first plane are continuous in at least one pixel unit along the data line direction thereby ensuring that light from adjacent pixel units is completely shielded to prevent mutual interference, wherein the first plane comprises the data lines and is perpendicular to the first substrate, or the first plane is parallel to a plane which comprises the data lines and is perpendicular to the first substrate.

2. The liquid crystal panel according to claim 1, wherein the sub shielding pillars are sheet-like and are mutually parallel.

3. The liquid crystal panel according to claim 1, wherein the sub shielding pillars are poly-line shaped.

4. The liquid crystal panel according to claim 3, wherein the sub shielding pillars are V-shaped.

5. The liquid crystal panel according to claim 1, wherein one or more sub shielding pillars are respectively in contact with the first substrate and the second substrate.

6. The liquid crystal panel according to claim 5, wherein a height of at least one sub shielding pillar is less than a distance between the first substrate and the second substrate.

7. The liquid crystal panel according to claim 1, wherein the shielding pillar is located above at least a part of the data lines.

8. The liquid crystal panel according to claim 7, wherein a width of the shielding pillar is greater than or equal to a width of the data line.

9. The liquid crystal panel according to claim 1, wherein the panel comprises a spacer, and the sub shielding pillars are disposed on at least two sides of the spacer.

10. The liquid crystal panel according to claim 9, wherein a material of the shielding pillar is the same as a material of the spacer.

11. The liquid crystal panel according to claim 1, wherein a height of the shielding pillar is equal to ¼ of a distance between the first substrate and the second substrate.

12. The liquid crystal panel according to claim 1, wherein the included angle is between about 20 degrees and about 60 degrees.

13. The liquid crystal panel according to claim 1, wherein the shielding pillar comprises a black resin material.

14. The liquid crystal panel according to claim 1, wherein a width of each sub shielding pillar is between about 0.1 μm and about 100 μm.

15. The liquid crystal panel according to claim 1, wherein a distance between the sub shielding pillars is between about 0.1 μm and about 40 μm.

16. The liquid crystal panel according to claim 1, wherein a liquid crystal on the panel is aligned by an optical alignment method.

17. A display device, comprising the liquid crystal panel according to claim 1.

* * * * *